United States Patent
Uzio et al.

(10) Patent No.: US 8,030,242 B2
(45) Date of Patent: Oct. 4, 2011

(54) PROCESS FOR SYNTHESIZING ANISOTROPIC METALLIC NANOPARTICLES USING TWO DIFFERENT REDUCING AGENTS

(75) Inventors: Denis Uzio, Belleville (FR); Catherine Verdon, Villeurbanne (FR); Cecile Thomazeau, Brignais (FR); Bogdan Harbuzaru, Lyons (FR); Gilles Berhault, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 401 days.

(21) Appl. No.: 12/093,535

(22) PCT Filed: Nov. 14, 2006

(86) PCT No.: PCT/FR2006/002512
§ 371 (c)(1),
(2), (4) Date: Oct. 8, 2008

(87) PCT Pub. No.: WO2007/057553
PCT Pub. Date: May 24, 2007

(65) Prior Publication Data
US 2009/0226357 A1    Sep. 10, 2009

(30) Foreign Application Priority Data
Nov. 14, 2005   (FR) ...................................... 05 11523

(51) Int. Cl.
*B01J 23/00*     (2006.01)
*B01J 21/00*     (2006.01)
*B01J 20/00*     (2006.01)

(52) U.S. Cl. ........ 502/325; 502/258; 502/259; 502/261; 502/328; 502/330; 502/332; 502/333; 502/334; 502/335; 502/336; 502/337; 502/338; 502/339; 502/355; 502/407; 502/415; 502/439

(58) Field of Classification Search .................. 502/104, 502/240–355, 407, 415, 439
See application file for complete search history.

(56) References Cited

U.S. PATENT DOCUMENTS

| | | | |
|---|---|---|---|
| 3,992,512 A | | 11/1976 | Petrow et al. |
| 4,425,261 A | | 1/1984 | Stenius et al. |
| 5,147,841 A | | 9/1992 | Wilcoxon |
| 6,074,979 A | | 6/2000 | Hagemeyer et al. |
| 6,090,746 A | * | 7/2000 | Bonnemann et al. ......... 502/325 |
| 6,197,720 B1 | | 3/2001 | Heineke et al. |
| 6,603,038 B1 | * | 8/2003 | Hagemeyer et al. ....... 560/241.1 |
| 6,992,039 B2 | * | 1/2006 | Jiang et al. .................... 502/327 |
| 7,244,688 B2 | * | 7/2007 | Reetz et al. ................... 502/182 |
| 2003/0187294 A1 | * | 10/2003 | Hagemeyer et al. .......... 560/241 |
| 2003/0232721 A1 | | 12/2003 | Zhou et al. |

FOREIGN PATENT DOCUMENTS

| | | |
|---|---|---|
| FR | 2 782 280 A1 | 2/2000 |
| FR | 2 874 514 A1 | 3/2006 |
| FR | 2 874 515 A1 | 3/2006 |

* cited by examiner

*Primary Examiner* — Cam N. Nguyen
(74) *Attorney, Agent, or Firm* — Millen, White, Zelano & Branigan, P.C.

(57) ABSTRACT

The invention concerns a process for preparing metallic nanoparticles with an anisotropic nature by using two different reducing agents, preferably with different reducing powers, on a source of a metal selected from columns 8, 9 or 10 of the periodic table of the elements.

23 Claims, 1 Drawing Sheet

Anisotropic nanoparticles of palladium, in accordance with Example 1 (in accordance with the invention):

Figure 1:

Anisotropic nanoparticles of palladium, in accordance with Example 1 (in accordance with the invention):

PROCESS FOR SYNTHESIZING ANISOTROPIC METALLIC NANOPARTICLES USING TWO DIFFERENT REDUCING AGENTS

FIELD OF THE INVENTION

The present invention concerns a process for preparing anisotropic metallic nanoparticles, in particular deposited on a support. Said nanoparticles can be used in catalysis, in particular in heterogeneous catalysis.

PRIOR ART

Metals, in particular transition metals, have been used for a number of years for their capacity to activate a certain number of molecules such as hydrocarbons, hydrogen, oxygen or carbon monoxide. The catalytic properties of metals as regards those molecules have been the focus of a large number of studies which have demonstrated their versatility as a function of the metal, the conditions employed and also their physico-chemical characteristics.

Chemisorption activation phenomena, i.e. phenomena governed by the adsorption of reactants and the chemical interactions between said reactants and the metallic particle, depend on the physico-chemical properties of the exposed metallic surfaces. The size of the metallic particle and the coordination of the surface atoms of that particle are two characteristics which must be taken into account when producing catalysts with optimal chemisorption properties, i.e. catalysts having an ability to adsorb reactants and interact chemically with said reactants.

The size of the metallic particle is generally selected as a function of the envisaged application.

Metallic nanoparticles are known to be capable of adopting various stable forms as a function of the number of atoms of which they are composed or chemical interactions with their environment, i.e., with a reactive atmosphere, for example. The metallic particles employed in heterogeneous catalysis have morphologies with a marked isotropic character, adopting geometric forms which depend on the number of atoms constituting the particle. These geometric forms include the icosahedral form for small particles with a size which is generally less than about 10 Angstroms (1 Angstrom=$10^{-10}$ m), and the truncated cubooctahedral form for large particles.

An aim of the invention is to provide a process for preparing a catalyst based on metallic nanoparticles which may or may not be deposited on a support in order to control the form of these nanoparticles, and in particular to allow the preparation of supported or unsupported nanoparticles with an anisotropic morphology, i.e. with a mean form factor F of less than 1.

A certain number of processes for synthesizing nanoparticles are already well known to the skilled person.

Examples which may be cited are lithographic processes and vapour phase growth processes.

Methods for synthesizing anisotropic nanoparticles using templates or matrices are also known to the skilled person. In those methods, the material is generated in situ within a matrix and acquires a morphology which is complementary to that of the template. The nanometric channels of the matrix are filled using a solution or a sol-gel, or using an electrochemical procedure. Reduction is then necessary to form nanoparticles within the matrix. The insufficient yield of anisotropic nanoparticles and the need to eliminate the matrix without deteriorating said nanoparticles are drawbacks of such techniques.

The skilled person is aware of processes for synthesizing nanoparticles in solution in an organic medium, for example in alcohol or a polyol, in which growth of the nanoparticles can be controlled by adsorption of a selective agent in a single step. Reduction is generally carried out under reflux, i.e. at the boiling point of the organic medium, and the organic phase acts both as a solvent for the selective adsorption agent, generally a polymer, and as a reducing agent for the metallic precursor. Such methods have been described by Y Sun, Y Xia, Advanced Materials, 2002, 14, 833-837. They have the disadvantage of using organic compounds which are weak reducing agents which have to be activated at a high temperature. The yields obtained are relatively low. Further, the operating parameters which allow the shapes of the nanoparticles to be controlled are fairly small in number. They are principally the temperature, which is within a relatively narrow range, and the ratio between the concentration of selective adsorption agent and that of the metallic precursor. Further, it is difficult to control the phases of seeding then growth of the particles.

Processes for synthesis in solution in an organic medium include some which can control growth of the metallic nanoparticles by selecting a metal precursor which is assumed to have ligands which favour reduction and growth in a given direction. In those synthesis methods, decomposition of such organometallic precursors is carried out as described by Chaudret et al, C R Chimie, 6, 2003, 1019-1034. An example which may be cited is the use of thiophenol or hexadecylamine ligands for the synthesis of nanotubes and nanofibres of platinum respectively, as described by Gomez et al, Chem Comm, 2001, 1474.

In addition to solution synthesis processes carried out in an organic medium, processes for synthesis in an aqueous medium also exist. The term "aqueous medium" means a medium comprising at least one primary aqueous phase and possibly an organic phase. More particularly, the present invention relates to the field of these aqueous medium synthesis methods.

The use of aqueous medium synthesis methods employing a surfactant is known for the preparation of catalysts having isotropic nanoparticles. The article by B Veisz and Z Kirali, Langmuir 2003, 19, 4817—describes the synthesis of isotropic palladium nanoparticles which are cubooctahedral in form. U.S. Pat. No. 4,714,693 describes a method for synthesizing supported nanoparticles by formation then deposition and reduction of micelles in interaction with the metallic precursor.

As an alternative to synthesis methods employing surfactants, the synthesis of anisotropic nanoparticles in an aqueous medium by selective adsorption of ions, molecules, polymers or surfactants onto certain crystalline faces of the metal is also known. Controlling the morphology by adding halide ions has also been observed by Filamkembo et al (J Phys Chem B, 2003, 107, 7492). These synthesis methods are solely used for copper, silver and gold.

In the field of aqueous medium synthesis methods using the selective adsorption of polymers onto certain crystalline faces of the metal, U.S. Pat. No. 6,090,858 describes a method used to produce colloidal nanoparticles of a transition metal, with particular forms, using a stabilizing agent, said method comprising dissolving a mixture of a metallic precursor and a stabilizing agent in aqueous solution followed by reduction in the presence of a single reducing agent, hydrogen.

This approach of controlled growth can also be achieved by, in a first step, synthesizing isotropic nanoparticles or nanoparticles with a less marked anisotropic nature, said nanoparticles then being used as seeds for growth in the presence of a selective adsorption agent and a suitable reducing agent. This approach, in which two reducing agent are used, has enabled anisotropic nanoparticles of silver and gold to be synthesized, as described by Busbee et al, Advanced Materials, 2003, 15, 414.

SUMMARY OF THE INVENTION

A process has been discovered for preparing anisotropic nanoparticles of metals from columns 8 to 10 of the periodic table of the elements, said process providing better morphological control.

The invention concerns a process for preparing metallic nanoparticles with an anisotropic nature or a marked anisotropic nature by employing two different reducing agents, preferably with different reducing powers, on a source of a metal selected from columns 8, 9 or 10 of the periodic table of the elements.

More precisely, the invention concerns a process for preparing anisotropic metallic nanoparticles comprising using two different reducing agents on a source of at least one metal selected from columns 8, 9 or 10 of the periodic table of the elements, said process comprising at least:
 a) one of the following steps:
  a1) impregnating a support with an aqueous solution comprising a source of at least one metal selected from columns 8, 9 or 10 of the periodic table of the elements, then bringing said support into contact with a reducing agent R1; or
  a2) bringing an aqueous solution comprising a source of at least one metal selected from columns 8, 9 or 10 into contact with a reducing agent R1;
 b) a step for forming anisotropic metallic nanoparticles by bringing the solution or support obtained in step a) into contact with a reducing agent R2 which is different from R1;
 c) if step a) is step a2), optionally depositing the anisotropic metallic nanoparticles onto a support.

The synthesis method which has been discovered can produce anisotropic nanoparticles with a mean form factor, F, of less than 1, in particular nanoparticles with a marked anisotropic nature, i.e. with a mean form factor F of less than 0.7, more preferably less than 0.5, for example 0.25.

Said form factor is defined by the formula $F=(4*\Pi*S)/P^2$, S and P being measured by transmission electron microscopy, S being the surface area of the particle measured in a plane of characterization, P being the perimeter of the particle measured in the same plane and in which said support has a porosity which is not ordered. The form factor F may be calculated from measurements carried out by transmission electron microscopy using the methods described by Coster M, Chermant J L, Précis d'analyse d'images [Manual of image analysis], CNRS, 1985. The mean form factor, F, is determined by statistical analysis, following the statistical counting rules known to the skilled person.

The nanoparticles may be of a size from a few angstroms to a few hundred nanometers. Advantageously, the mean size (i.e. the size along the largest dimension of the particles) of the nanoparticles is in the range 2 to 500 nanometers or 5 to 200 nm, preferably more than 10 nm, for example 10 to 500 nm, or 10 to 200 nm, or 10 to 120 nm. Surprisingly, it has been established that sizes of more than 10 nm unexpectedly result in good catalytic performances.

These nanoparticles may be isolated or may form networks, for example entangled fibres, fractal structures, or metallic foams.

Thus, the invention concerns solid materials containing anisotropic metallic nanoparticles obtained by the process of the invention and also a suspension containing them. It also concerns the nanoparticles obtained by the process of the invention, in the solid form and separated from the liquid. It also concerns a support comprising anisotropic metallic nanoparticles obtained by the process of the invention.

The above suspension of nanoparticles in the solid form, and separated from the liquid, and the support comprising anisotropic metallic nanoparticles as defined above can be used as catalysts.

The invention also concerns applications of the solids described above for the separation or adsorption of molecules, and for gas storage.

The catalyst may be used for the catalytic transformation of organic molecules; in particular, it is used for the catalytic reforming of hydrocarbons, for total or selective hydrogenation, for dehydrocyclization, for the dehydrogenation of hydrocarbons, for Fischer-Tropsch synthesis, or for the total or selective oxidation of carbon monoxide.

DETAILED DESCRIPTION OF THE INVENTION

Metals and Sources of Metals (Columns 8, 9 or 10)

The metal of the nanoparticles produced is selected from metals belonging to columns 8, 9 and 10 of the periodic table of the elements. Preferably, the metal of the nanoparticles produced is selected from nickel, cobalt, iron, ruthenium, platinum, palladium and iridium, preferably cobalt, nickel, platinum or palladium. In contrast to gold, silver or copper, which by nature have a good aptitude for reduction, it has been found that the metals listed above can surprisingly be used in the synthesis process of the invention.

The anisotropic metallic nanoparticle may comprise a single metallic element or several metallic elements. In the case of nanoparticles comprising several metallic elements, these latter may be associated in any manner known to the skilled person. Any mixture may be used, such as an alloy, a solid solution or any structure comprising a core and/or a shell.

The method of the invention can also produce a catalyst based on nanoparticles of several metals. The term "nanoparticles of a metal selected from columns 8 to 10" means nanoparticles of at least one metal selected from said columns.

The source of the metal may be any salt of a precursor of the metal under consideration with an oxidation number for the metal of more than 0. This salt may be a simple halide or oxide or hydroxide of the metal under consideration, or a salt combining a halide with an alkali or alkaline-earth compound, an amine group or ammonia. This salt may also be a nitrate, nitrite or sulphate of the metal considered alone or in association with an amine function. This salt may also include at least one organic ligand.

As an example, it may be possible to use, as the palladium source, palladium chloride, palladium bromide, palladium iodide, potassium hexachloropalladate, ammonium hexachloropalladate, potassium tetrabromopalladate, potassium tetrachloropalladate, ammonium tetrachloropalladate, sodium hexachloropalladate, sodium tetrachloropalladate, palladium nitrate, palladium nitrite, diaminepalladium nitrite, palladium sulphate, tetraaminepalladium nitrate, palladium dichlorodiamine, palladium acetate or palladium acetylacetonate.

The amount of the metal source in the solution which undergoes a reduction step may be in the range $10^{-5}$ to 1 mole/litre, preferably in the range $5 \times 10^{-5}$ to $10^{-1}$ mole/litre, and more preferably in the range $10^{-4}$ to $10^{-2}$ mole/litre.

Two Different Reducing Agents R1 and R2

In a further aspect of the method of the invention, a second reducing agent R2 which is different from R1 is added. The term "different reducing agents" means reducing agents with different reducing powers.

In general, the reducing agent R1 has a higher reducing power than reducing agent R2.

The reducing agents employed may be inorganic or organic in nature. Preferably, the reducing agents (R1 and R2) are selected from the group constituted by:

hydrogen, hydrazine, hydroxylamines, alkali borohydrides and hydrides for the inorganic reducing agents; and carboxylic acids, alcohols, polyols, aldehydes, ketones and their ions for the organic reducing agents.

Preferably:

the reducing agent R1 is selected from the group constituted by hydrogen, hydrazine, hydroxylamines, hydrides and borohydrides, and/or the reducing agent R2 is selected from the group constituted by carboxylic acids, alcohols, polyols, aldehydes, ketones and their ions.

Adding each of the reducing agents R1 and R2 during steps a) and b) is advantageously carried out with stirring, each reducing agent possibly being added jointly or separately in a gradual manner.

Preferably, if the reducing agent R2 has a protonated function (carboxylic acid, alcohol, ... ), a base is added during step b). More preferably, the base added during step b) is sodium hydroxide. Adding sodium hydroxide can produce the corresponding anion by deprotonation, this latter having a higher reducing power. Preferably, the base (preferably sodium hydroxide) is in an equimolar quantity with respect to the reducing agent.

Preferably, an inorganic salt is added during step b). This can control the interaction between the growth agent and the forming anisotropic nanoparticle.

This salt may be any type of inorganic compound comprising halide anions, such as chloride, bromide, fluoride, nitrates, nitrites or sulphates. Preferably, the inorganic salt added in step b) is selected from the group constituted by alkali and alkaline-earth halides.

The quantity of inorganic salt which is added is generally in the range $10^{-4}$ to 0.5, preferably in the range $5 \times 10^{-4}$ to 0.1, and more preferably in the range $10^{-3}$ to 0.05 mole/litre of the total volume of the solution which undergoes step b).

Addition of at Least One Stabilizing Agent (Optional)

Preferably, at least one stabilizing agent is added to at least one of the solutions in contact with one of the reducing agents.

The stabilizing agent may thus be added to the solution of the metal source or to the solution of step a2) before contact with R2, or it is present in step b).

Generally, this stabilizing agent is at least present to carry out step b). In the case of a method using a single reduction step, this stabilizing agent is generally added to the solution obtained prior to introducing R2.

Preferably, the stabilizing agent is a surfactant, a complexing agent and, more generally, any compound which may act as a stabilizing agent or complexing agent.

In the method of the invention, it is possible to use one or more stabilizing agents which may be used simultaneously or in succession. The amount of stabilizing agent in the solution which undergoes a reduction step may be in the range $10^{-4}$ to 2 mole/litre.

In one case, at least one stabilizing agent may be a surfactant. The term "surfactant" means any organic compound with a hydrophilic polar function and a hydrophobic hydrocarbon chain. When the surfactant is used as a stabilizing agent, its quantity in the aqueous solution which undergoes a reduction step is generally in high excess with respect to the quantity of metal source.

Advantageously, the surfactant may be any compound with general formula $Rx(R'y)3(X)zYd$ in which:

x and y are in the range 0 to 4;

z and d are in the range 0 to 2;

R is a hydrocarbon chain containing 1 to 25 carbon atoms, preferably 8 to 18;

R' is any aliphatic, aromatic or heteroaromatic group known to the skilled person;

X is a cationic element selected from the group formed by alkalis, alkaline-earths or an ammoniacal group;

Y is an anionic element such as a halide, nitrate, nitrite or sulphate.

In the case in which a surfactant is used as a stabilizing agent, it also possible to use a co-surfactant.

In another case, at least one stabilizing agent may be a complexing agent. The complexing agent per se may be:

any organic compound having a carbonyl function, for example any compound comprising a citrate, acetate or acetylacetonate group, polymers such as polyvinylpyrrolidone, fatty acids or carboxylic acids such as oleic acid;

any organic compound having an amine function, preferably an aliphatic amine such as hexadecylamine;

any organic compound having a phosphine function, for example triphenylphosphine or trioctylphosphine oxide;

any organic compound having a thiol function, for example octanethiol or dodecanethiol;

chelating agents;

any organic compound having a thiophenol, diphosphite or alcohol function; as well as any other combination associating several of the functions listed above.

The stabilizing agent may be introduced by any means known to the skilled person.

Preferably, the following procedure is used:

separately dissolving the stabilizing agent and metal source;

followed by mixing at least a portion of said solutions.

This allows better control of dissolution of the surfactant, which induces greater self-organization in the vicinity of the micelles.

The Reduction Steps

As described above, the reducing agents R1 and R2 may be introduced in various manners.

In the two-stage reduction steps, the reducing agents R1 and R2 are introduced separately to carry out two separate reduction steps.

In the single step reduction methods, the reducing agents R1 and R2 are introduced jointly or consecutively in order to carry out a single reduction step.

The reducing agents R1 and R2 may be introduced in various manners. In general, we distinguish between two-step reduction methods and single step reduction methods.

In the two-step reduction methods, reducing agents R1 and R2 are introduced separately to carry out two distinct reduction steps. In a first step a), reduction of a source of a metal using a first reducing agent R1 produces seeds of nanoparticles which do not have a marked anisotropic nature, i.e. having a form factor of more than 0.7. This step may be termed the germination step. These nanoparticle seeds may or may not be supported. In a second step, generally termed the growth step, nanoparticles are formed which may or may not be supported, by reduction of a source of metal using a second reducing agent R2 in the presence of the seeds prepared in step a).

In single-step methods, seed formation and growth are carried out in a single reduction step. Steps a) and b) are carried out jointly. Reducing agents R1 and R2 are introduced so as to carry out a single step for reduction of a metal source. An aqueous solution based on a metal source is pre-formed during a step a) with the reducing agent R1. Reducing agent R2 is introduced jointly or separately in any order, i.e. before, after or during step b).

In the remainder of the text, steps a) and b) will be said to be carried out "simultaneously".

More precisely, steps a1)+b) or a2)+b) may be carried out jointly in a "single step" process.

In steps a1)+b) or a2)+b), step b) may be carried out after step a) in a "two step" process by introducing the reducing agent R2 after forming seeds of the metallic nanoparticles.

The temperatures at which steps a) and b) are carried out are generally between ambient temperature and less than 100° C., usually less than 70° C.

In the case in which a stabilizing agent is used, the reduction step is generally carried out at a temperature at which the stabilizing agent remains stable in solution. As an example, in the case in which the stabilizing agent is cetyltrimethylammonium bromide, this is kept during the reduction step at a minimum temperature of 30° C. in order to prevent crystallization of this stabilizing agent.

The process of the invention operates with two reduction steps on a source of a metal from columns 8, 9 or 10 in accordance with the following modes:

Mode 1:
a2)+b)+optionally c), i.e.:
a2) bringing an aqueous solution comprising a source of at least one metal selected from columns 8, 9 or 10 into contact with a reducing agent R1;
b) a step for forming anisotropic metallic nanoparticles by bringing the solution obtained in step a2) into contact with a reducing agent R2 which is different from reducing agent R1;
c) optionally, depositing the anisotropic metallic nanoparticles on a support.

At the end of step b), anisotropic metallic nanoparticles are obtained in suspension.

As explained above, the reducing agents R1 and R2 may be introduced in succession (R2 thus being introduced after seed formation) or at the same time (single-step process). In an alternative,
two aqueous solutions are formed comprising a source of a metal selected from columns 8, 9 or 10 of the periodic table of the elements and a stabilizing agent;
an aqueous solution of reducing agent R2 is added, and the reducing agent R1 is added to the other;
at least a portion of the two solutions are mixed.

Mode 2
a1)+b), i.e.:
a1) impregnating a support with an aqueous solution comprising a source of at least one metal selected from columns 8, 9 or 10 of the periodic table of the elements, then bringing said support into contact with a reducing agent R1;
b) a step for forming anisotropic metallic nanoparticles by bringing the support obtained in step a1) into contact with a reducing agent R2 which is different from the reducing agent R1.

In step a1), a support which is impregnated (preferably dry impregnated) with the element from columns 8, 9 10 is prepared which is brought into contact with at least one reducing agent R1.

It may be brought into contact with R1 to form said seeds, then with R2 to obtain anisotropic nanoparticles by growth of said seeds.

It may also be brought into contact with R1 and R2 at the same time.

The Support, Impregnation and Production of the Materials of the Catalyst

Preferably, the support is an oxide without an ordered texture. The term "support without an ordered texture" generally means a support which does not have a particular structural property, or a texture with a particular geometry, or mesostructures (i.e. supports with an ordered texture on the scale of the pores).

The support is generally based on at least one refractory oxide selected from alumina, silica, a silica-alumina, magnesium oxide, zirconium oxide, thorium oxide or titanium oxide, taken alone or as a mixture. Preferably, said support is alumina, silica or silica-alumina.

The support may also be a coal, a silico-aluminate, a clay or any other compound which is known for use as a support as defined in the invention.

Preferably, the support has a BET specific surface area in the range 5 to 300 $m^2/g$.

The support may be used in the form of a powder, or it may be formed into beads, extrudates, trilobes, powder or a monolith.

On this support, the anisotropic nanoparticles may be isolated or may form networks such as entangled fibres, fractal structures or metallic foams.

The step for depositing the elements from columns 8 to 10 or nanoparticles on the support surface may be carried out using any means which is known to the skilled person, advantageously by dry impregnation.

In a mode c1), after steps a2)+b) for forming unsupported anisotropic metallic nanoparticles (in suspension), they may be separated from the liquid using any means which is known to the skilled person. As an example, these means may include centrifuging, for example at 5000 rpm for 45 minutes. They may optionally be washed, dried at a temperature of 120° C. or less, preferably 80° C. or less, or 50° C. or less, in an inert atmosphere or in air. Thus, a solid which is essentially constituted by metallic nanoparticles is obtained.

In a mode c2), the unsupported anisotropic metallic nanoparticles obtained during step b) are deposited on a support by impregnation, advantageously by dry impregnation.

The depositing step may be carried out from the solution obtained in step b) or by taking the metallic nanoparticles obtained in step c1) (in a quantity corresponding to the desired quantities for the material or the suspension to be used) up into suspension and bringing said solution into contact with a support.

After impregnation, the support is separated from any residual liquid by filtration, dried at a temperature of 120° C. or less (preferably 80° C. or less or 50° C. or less) in an inert atmosphere or in air.

For "direct" preparation of supported particles in accordance with step a1), the support is separated from any residual solution, dried at a temperature of 120° C. or less (preferably 80° C. or less or 50° C. or less) in an inert atmosphere or in air.

Advantageously, the solid obtained undergoes an activation treatment in a reducing atmosphere, at a temperature of 600° C. or less, preferably 400° C. or less, or 100° C. or less, or even 80° C. or less or 50° C. or less.

When other elements are added to the supported material, this treatment may be carried out before said additions or after said additions. This ensures that the metallic phase is correctly activated.

The suspension of unsupported particles may also undergo said treatment.

In general, at least one element selected from the group formed by the following may be introduced into the support:
  elements from column 13 of the periodic table of the elements;
  elements from column 14 of the periodic table of the elements;
  alkali metals, preferably lithium, sodium or potassium, and/or alkaline-earths, preferably magnesium, calcium, strontium or barium; and/or
  halogens;
  elements from column 11.

In general, these elements are introduced by impregnation after depositing the nanoparticles onto the support.

Optional addition of at least one alkali metal and/or at least one alkaline-earth may be carried out to obtain an alkali metal and/or alkaline-earth metal content in the catalyst in the range 0 to 20% by weight, preferably in the range 0 to 10% by weight, more preferably in the range 0.01% to 5% by weight.

Optional addition of at least one halogen may be carried out to obtain a halogen content in the catalyst in the range 0 to 0.2% by weight.

In accordance with the invention, highly advantageously, the solid or the suspension obtained undergoes an activation treatment with hydrogen at a temperature of less than 600° C., preferably less than 400° C., or less than 100° C., preferably less than 80° C. or more preferably less than 50° C. When other elements are added to the supported material, this treatment may take place before said additions or after said additions.

The Products Obtained

Thus, the invention can produce solid materials containing anisotropic metallic nanoparticles as well as suspensions containing said particles.

In these materials or suspensions, generally at least 50% by weight, preferably at least 70% by weight, more preferably at least 90% by weight of metals from groups 8 to 10 is in the form of anisotropic metallic nanoparticles.

As an example, the nanoparticles obtained by the method of the invention may have a rod or fibre type morphology, or even a tubular morphology, with solid or hollow tubes. The metallic nanoparticles of catalyst obtained by the method of the invention can also have a cylindrical morphology, which can be defined by its length to width ratio. In this case, the length to width ratio may be equal to 5 or 10, which corresponds to a form factor of about 0.43 and 0.25 respectively.

In the case of a material (in particular used as a catalyst), in particular based on supported nanoparticles, the quantity of metal from groups 8 to 10 is preferably in the range 0.01% to 50% by weight, preferably in the range 0.01% to 35% by weight. Generally, and in particular for use as a catalyst, the process of the invention is applicable for the amounts of metals which are normally used.

Use of Products Obtained

The anisotropic metallic nanoparticles and products containing them (such as the suspensions or solid materials described above) obtained by the process of the invention may advantageously be used as catalysts.

The solid materials comprising a support and anisotropic metallic nanoparticles obtained by the process of the invention may also be used as adsorbents or in separation membranes. Thus, the invention also concerns a process for separating or adsorption of molecules, or storage of gas with said materials.

More preferably, the catalyst (preferably in the supported form) obtained by the process of the invention is used for the catalytic transformation of organic molecules. Such uses are generally encountered in the refining and petrochemicals fields.

Examples are the catalytic reforming of hydrocarbons, total or selective hydrogenation, dehydrocyclization, hydrocarbon dehydrogenation, the Fischer-Tropsch synthesis or the total or selective oxidation of carbon monoxide.

For all of the processes cited for the catalytic transformation of organic molecules, the catalysts may be used under conventional operating conditions and with conventional feeds to be processed. A few indications will be given below.

The separation uses may employ dense metallic membranes exploiting the intrinsic properties of certain metals, such as the dissolution and diffusion of molecules, such as hydrogen or oxygen, into their metallic network to purify gas streams as described in Japanese patent application JP2002153740.

Thus, for example, a membrane purification unit will be operated at a temperature in the range 300° C. to 600° C., and at a pressure in the range 0.6 to 2 MPa relative to separate a gaseous effluent which is very high purity hydrogen, generally more than 95% pure, and preferably more than 99% pure.

Uses linked to gas storage, such as hydrogen storage, may also employ metallic systems exploiting the adsorption capacities of multimetallic formulations, as described in International patent application WO-A-2004/027102. Hydrogen may be stored at a pressure of $H_2$ in the range 0 to 10 atmospheres, at a temperature in the range 0° C. to 100° C.

Catalytic hydrocarbon reforming is generally intended to produce a fuel with a high octane number using platinum-based catalysts, as described in U.S. Pat. Nos. 5,562,817 or 6,315,892. The catalyst may also be used for the production of aromatic hydrocarbons.

The temperature is generally in the range 400° C. to 600° C., preferably 480° C. to 580° C., and the pressure is between 0.1 and 3.5 MPa, preferably between 0.2 and 1.8 MPa, for a space velocity of 0.1 to 10 volumes of liquid feed per volume of catalyst, with a $H_2$/hydrocarbons ratio between 1 and 20, preferably between 1 and 6.

Selective hydrogenation is generally intended to purify effluents from a steam cracker or catalytic cracker using palladium-based catalysts as described by "W K Lam, L Lloyd, Oil & Gas Journal, pp 66-70, March 1972". Reference may be made to the conditions described in European patent EP-A-0 899 012 for the selective hydrogenation of diolefins or acetylenes.

The conditions generally used for this type of transformation are a mean temperature in the range 25° C. to 200° C., a pressure in the range 0.1 to 10 MPa and a molar ratio of hydrogen to hydrocarbons in the range 1 to 150.

For total hydrogenation (EP-A-0 899 012) of hydrocarbons including alkyne, diene or olefin functions, or aromatics, a mean temperature in the range 10° C. to 400° C. is used at a pressure in the range 0.1 to 10 MPa.

Fischer-Tropsch synthesis is intended to produce higher hydrocarbons from synthesis gas comprising carbon monoxide and hydrogen.

Reference may be made in this respect to U.S. Pat. No. 6,214,890. In general, syngas conversion takes place at 0.1-15 MPa, 150-350° C., 100-20000 volumes of gas/volume of catalyst per hour, with a feed with a $H_2$/CO ratio of 1.2 to 2.5; the process may be carried out using a fixed bed or a slurry.

Carbon monoxide oxidation reactions are intended to purify gaseous effluents containing carbon monoxide, possibly in the presence of other compounds such as hydrogen. A reference example can be found in FR-A-2 867 464.

The total oxidation of CO may be carried out at high temperature in the range 350° C. to 550° C. The total pressure of the high temperature CO conversion unit is in the range 0.6 to 2 MPa relative.

The CO oxidation reaction may be carried out at low temperature in the range 180° C. to 260° C. The total pressure of the low temperature CO conversion section is in the range 0.6 to 2 MPa relative.

The selective CO oxidation reaction is carried out for total pressures in the range from atmospheric pressure to 50 rods, preferably in the range from atmospheric pressure to 20 rods, and more preferably in the range from atmospheric pressure to 10 rods. The temperature is in the range from 20° C. to 200° C., preferably in the range 50° C. to 150° C., and more preferably in the range 70° C. to 130° C. The CO/$O_2$ molar ratio is in the range 0.5 to 5, preferably in the range 1 to 4. The CO:$H_2$ weight ratio is in the range 0.5:50 to 5:50, preferably in the range 1:50 to 3:50.

Dehydrocyclization (EP-A-1 252 259) generally takes place at pressures of 0.1 to 4 MPa (preferably 0.3-0.8 MPa for regenerative reforming and for the aromatics production process, 0.02-2 MPa for the dehydrogenation of C3-C22 paraffins), 300-800° C. (preferably 400-700° C. and more preferably 480-600° C. for regenerative reforming and for the aromatics production process; 400-550° C. for C3-C22 paraffin dehydrogenation), space velocities of 0.1 to 10 h$^{-1}$ and preferably 1-4 h$^{-1}$ and with different $H_2$/hydrocarbons ratios (recycled hydrogen/hydrocarbons (mol) of 0.1 to 10, preferably 3-10, and more particularly 3-4 in the first reactor used for regenerative reforming and 4-6 for the aromatics production process; $H_2$/hydrocarbons of 10-100 litres of hydrocarbons per litre of catalyst per hour for C3-C22 paraffin dehydrogenation).

EXAMPLES

The method for producing the nanoparticles of the invention will be illustrated in the following examples. The performances of the catalysts comprising the nanoparticles obtained directly by the method of the invention were compared with those of catalysts obtained by prior art methods. These examples are given by way of illustration and do not limit the scope of the invention.

The morphology of the nanoparticles of the catalysts employed in these examples was characterized by transmission electron microscopy. The electron microscope used was the Jeol 2010© model sold by JEOL. This microscope had an acceleration tension of 200 kV, a spatial resolution of 0.2 nm and a detection limit for the supported metallic particles of the order of 0.7 nm.

The form factor F was determined using IMAGIST© image processing software developed by Image Processing and Analysis, Princeton Gamma Tech.

Before carrying out the transmission electron microscopy characterization, the catalyst samples were prepared using a procedure including dissolving in ethanol, depositing a drop of solution on the analysis grid, drying and introducing said grid into the microscope.

Example 1

Synthesis of Supported Anisotropic Nanoparticles of Palladium (Catalyst A, in Accordance with the Invention, Using Implementation a2))

Firstly, 25 ml of an aqueous solution of cetyltrimethylammonium bromide in a concentration of 0.3 mole/litre was added to an aqueous solution of 50 ml of $Na_2PdCl_4.3H_2O$ in a concentration of 5×10$^{-4}$ mole/litre. 6 ml of an aqueous sodium borohydride solution in a concentration of 0.01 mole/litre was then added dropwise, with stirring. After stirring for 10 minutes, the solution of nanoparticles which had been prepared was allowed to stand for 2 hours.

Figure 1:
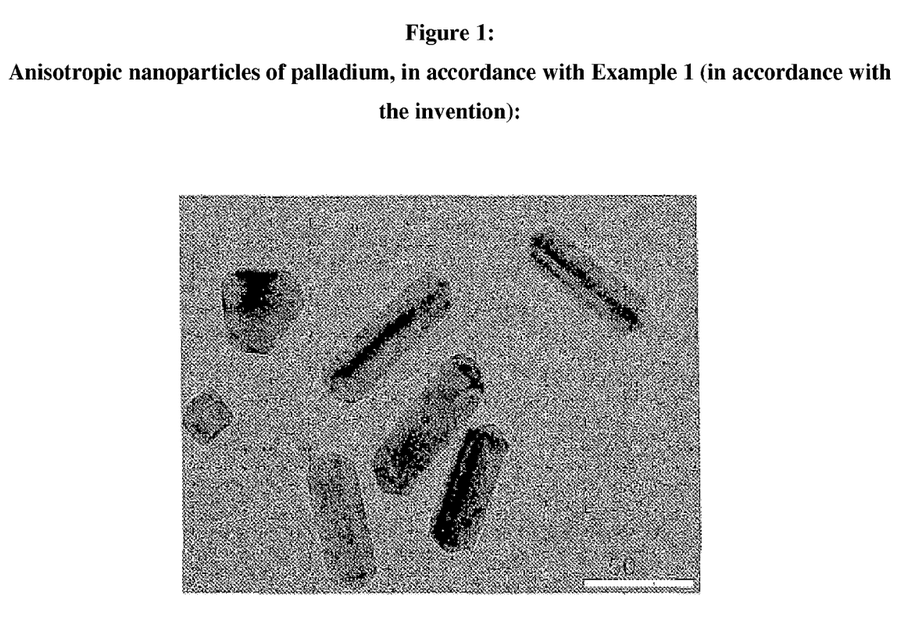
FIG. 1 is not limiting in nature and shows an electron microscopic photograph of anisotropic nanoparticles of palladium obtained in accordance with Example 1.

Next, 50 ml of an aqueous solution of cetyltrimethylammonium bromide in a concentration of 0.08 mol/l was added to an aqueous solution of 50 ml of $Na_2PdCl_4.3H_2O$ in a concentration of 10$^{-4}$ mol/l. 700 μl of a solution of ascorbic acid in a concentration of 0.08 mol/l was then added dropwise, as well as 112 μl of 0.5 N NaOH. To this solution, denoted B, 60 μl of solution A was then added. The solution turned black after 1 hour. The anisotropic nanoparticles formed contained 60% rods (form factor <0.7), 15% polyhedra, 10% tetrahedra and 15% cubes. The nanoparticles formed had a mean form factor F of 0.54. An electron microscope image of these nanoparticles is shown in FIG. 1.

After centrifuging, the anisotropic palladium nanoparticles obtained were deposited on an alumina. The catalyst was then dried overnight at 30° C. Catalyst A so prepared contained 0.3% by weight of palladium.

Example 2

Synthesis of Supported Anisotropic Nanoparticles of Platinum (Catalyst B, not in Accordance with the Invention)

Firstly, 25 ml of an aqueous solution of cetyltrimethylammonium bromide in a concentration of 0.3 mole/litre was added to an aqueous solution of 50 ml of $Pt(NH_3)_4(OH)_2$ in a concentration of 5×10$^{-4}$ mole/litre. 12 ml of an aqueous sodium borohydride solution in a concentration of 0.01 mole/litre was then added dropwise, with stirring. After stirring for 10 minutes, the solution B1 of nanoparticles which had been prepared was allowed to stand for 2 hours.

Next, 1 ml of solution B1 was deposited onto an alumina. The catalyst was then dried overnight at 30° C. Catalyst B2 obtained was then brought into contact, with stirring, with an aqueous solution B3 containing 50 ml of cetyltrimethylammonium bromide in a concentration of 0.24 mol/l and 50 ml of $Pt(NH_3)_4(OH)_2$ in a concentration of 3×10$^{-4}$ mol/l. 14 ml of ascorbic acid in a concentration of 0.08 mol/l was then added dropwise, as well as 336 μl of 0.5 N NaOH. The solution turned dark after 2 hours.

The anisotropic nanoparticles supported on alumina which were formed contained 50% rods (form factor <0.7), 25% polyhedra, 20% tetrahedra and 5% cubes. The supported nanoparticles had a mean form factor F of 0.50.

The catalyst was then dried overnight at 30° C. Catalyst B so prepared contained 0.3% by weight of platinum.

Example 3

Synthesis of Supported Anisotropic Nanoparticles of Cobalt (Catalyst C, in Accordance with the Invention Using Implementation a2))

25 ml of an aqueous solution of cetyltrimethylammonium bromide in a concentration of 0.3 mole/litre was added to an aqueous solution of 50 ml of $Co(NO_3)_2$ in a concentration of $5 \times 10^{-4}$ mole/litre. 12 ml of an aqueous sodium borohydride solution in a concentration of 0.01 mole/litre was then added dropwise, with stirring. After stirring for 10 minutes, a solution C1 was obtained. To this solution, an aqueous solution C2 containing 50 ml of $Co(NO_3)_2$ in a concentration of $10^{-3}$ mol/l, 50 ml of cetyltrimethylammonium bromide in a concentration of 0.08 mol/l, 5 ml of ascorbic acid in a concentration of 0.08 mol/l and 2 ml of 0.5 N NaOH were then added. The solution obtained turned dark after 2 hours.

After centrifuging, the anisotropic cobalt nanoparticles obtained were deposited onto an alumina.

The anisotropic nanoparticles supported on alumina which were formed contained 65% rods (form factor <0.7), 15% polyhedra, 10% tetrahedra and 10% cubes. The mean form factor F was 0.55.

The catalyst was then dried overnight at 30° C. Catalyst C so prepared contained 5% by weight of cobalt.

Example 4

Synthesis of Isotropic Nanoparticles of Palladium Supported on Alumina (Catalyst D, not in Accordance with the Invention)

A Pd catalyst supported on alumina containing isotropic particles of Pd was prepared by excess impregnation of a solution of toluene containing the precursor $Pd(acac)_2$. The catalyst was then dried overnight at 120° C. and calcined in air at 350° C. for 2 h.

Catalyst D so prepared contained 0.3% by weight of palladium. The size of the supported particles was in the range 2 to 5 nm; their morphology, observed by transmission electron microscopy, was spherical in type, with a form factor F of 1.

Example 5

Synthesis of Isotropic Nanoparticles of Platinum Supported on Alumina (Catalyst E, not in Accordance with the Invention)

A platinum catalyst supported on alumina containing isotropic particles of platinum was prepared by excess impregnation of a solution of toluene containing the precursor $Pt(acac)_2$. The catalyst was then dried overnight at 120° C. and calcined in air at 350° C. for 2 h.

Catalyst E so prepared contained 0.3% by weight of Pt. The size of the supported particles was in the range 2 to 5 nm; their morphology, observed by transmission electron microscopy, was spherical in type, with a form factor F of 1.

Example 6

Synthesis of Isotropic Nanoparticles of Cobalt Supported on Alumina (Catalyst F, not in Accordance with the Invention)

A catalyst based on cobalt supported on an alumina comprising isotropic particles of cobalt was prepared by dry impregnation of a solution of $Co(NO_3)_2$, drying overnight at 120° C. and calcining at 200° C.

Catalyst F so prepared contained 5% by weight of cobalt. The particle size was in the range 3 to 9 nm; their morphology was spherical in type, with a mean form factor F of 1.

Example 7

Synthesis of Supported Anisotropic Nanoparticles of Palladium (Catalyst G, in Accordance with the Invention Using Implementation A1))

Firstly, 50 ml of a palladium nitrate solution was prepared by diluting 1.3 g of palladium nitrate containing 7.8% by weight of palladium. Next, 50 ml of sodium hydroxide solution was prepared by diluting 7.5 ml of 1N NaOH. The palladium nitrate solution was added to the NaOH solution. The pH of the solution obtained was 13. This solution was then impregnated onto an alumina. The solid G1 obtained was dried overnight at 120° C., calcined at 200° C., and reduced in hydrogen at 150° C. for 2 hours.

This solid G1 was then transferred in the absence of air at ambient temperature into 300 ml of an aqueous solution containing 0.3 g of sodium tetachloropalladate, 26.4 g of cetyltrimethylammonium bromide, 0.96 g of ascorbic acid. The pH was brought to 11 by adding 5N NaOH. This solution was stirred for 24 hours.

The solution was filtered. Catalyst G so prepared was dried overnight at 30° C. It contained 0.3% of Pd. The anisotropic nanoparticles formed contained 70% rods, 20% polyhedra, 10% cubes; thus, the nanoparticles formed had a mean form factor F of 0.45.

Example 8

Synthesis of Supported Anisotropic Nanoparticles of Palladium (Catalyst H, Prior Art)

Firstly, 25 ml of an aqueous solution of cetyltrimethylammonium bromide in a concentration of 0.3 mole/litre was added to an aqueous solution of 50 ml of $K_2PdCl_4$ in a concentration of $5 \times 10^{-4}$ mole/litre. 12 ml of an aqueous sodium borohydride solution in a concentration of 0.01 mole/litre was then added dropwise, with stirring. After stirring for 10 minutes, the solution H1 of nanoparticles which had been prepared was allowed to stand for 2 hours.

Next, 1 ml of solution H1 was deposited onto an alumina. The catalyst was dried overnight at 30° C. Catalyst H2 obtained was then brought into contact, with stirring, with an aqueous solution H3 containing 50 ml of cetyltrimethylammonium bromide in a concentration of 0.24 mol/l and 50 ml of $K_2PdCl_4$ in a concentration of $3 \times 10^{-3}$ mol/l. 14 ml of ascorbic acid in a concentration of 0.08 mol/l was then added dropwise, along with 336 μl of 0.5N NaOH. The solution turned dark after 10 minutes.

The anisotropic nanoparticles supported on alumina which were formed contained 40% rods (form factor <0.7), 35% polyhedra, 10% tetrahedra and 15% cubes. The mean form factor F of the supported nanoparticles was 0.64.

The catalyst was then dried overnight at 30° C. Catalyst H thus prepared contained 0.3% by weight of palladium.

Example 9

Synthesis of Supported Anisotropic Nanoparticles of Platinum (Catalyst I, in Accordance with Implementation a2) of the Invention)

Firstly, 25 ml of an aqueous solution of cetyltrimethylammonium bromide in a concentration of 0.3 mole/litre was added to an aqueous solution of 50 ml of $K_2PtCl_4.3H_2O$ in a concentration of $5\times10^{-4}$ mole/litre. 6 ml of an aqueous sodium borohydride solution in a concentration of 0.01 mole/litre was then added dropwise, with stirring. After stirring for 10 minutes, the solution A of nanoparticles which had been prepared was allowed to stand for 2 hours.

Next, 50 ml of an aqueous solution of cetyltrimethylammonium bromide in a concentration of 0.08 mol/l was added to an aqueous solution of 50 ml of $K_2PtCl_4.3H_2O$ in a concentration of $10^{-3}$ mol/l. 700 μl of a solution of ascorbic acid in a concentration of 0.08 mol/l was then added dropwise, along with 112 μl of 0.5N NaOH. 60 μl of solution A was then added to this solution, denoted B. The solution had turned black after 6 hours.

The anisotropic nanoparticles which were formed contained 65% rods (form factor <0.7), 25% polyhedra, 5% tetrahedra and 5% cubes. The mean form factor F of the nanoparticles which were formed was 0.47. An electron microscopic image of these nanoparticles is shown in FIG. 1.

After centrifuging, the anisotropic platinum nanoparticles obtained were deposited onto an alumina. The catalyst was then dried overnight at 30° C. Catalyst I so prepared contained 0.3% by weight of platinum.

Example 10

Catalytic Test for Hydrogenation of 1,3-Butadiene 1,3-butadiene hydrogenation was carried out in the liquid phase (n-heptane) in a perfectly stirred "Grignard" type batch reactor under a constant pressure of 2 MPa of hydrogen and at a thermostatted temperature of 17° C. The reaction products were analyzed by gas chromatography. The catalytic activities, expressed in moles of $H_2$ per minute per gram of metal, were determined by monitoring the pressure drop. These activities are reported in Table 1. The selectivities for 1-butene were measured at 80% conversion of 1,3-butadiene. Before the test, catalysts A, B, G, H and I were pre-treated in hydrogen at 50° C. Catalyst D was pre-treated in hydrogen at 200° C. Catalyst E was pre-treated in hydrogen at 550° C.

TABLE 1

Activities and selectivities measured by 1,3-butadiene hydrogenation

|  | Activity Mol/min/g metal | 1-butene selectivity |
| --- | --- | --- |
| Catalyst A-Pd | 3.5 | 60 |
| Catalyst G-Pd | 6.5 | 57 |
| Catalyst H-Pd | 3.0 | 60 |
| Catalyst D-Pd | 2.5 | 60 |
| Catalyst I-Pt | 1.7 | 63 |
| Catalyst B-Pt | 1.2 | 63 |
| Catalyst E-Pt | 0.57 | 60 |

Catalysts A and G the metallic particles of which had a mean form factor F of 0.54 and 0.45 respectively had a catalytic activity for hydrogenation of 1,3-butadiene (expressed in grams of palladium) which was higher than that of catalyst D which contained isotropic metallic particles with a form factor F of 1 and than that of catalyst H which contained anisotropic particles having a mean form factor F of 0.64.

Catalysts B and I which had metallic particles with a mean form factor F of 0.50 and 0.47 respectively had a catalytic activity for the hydrogenation of 1,3-butadiene (expressed in grams of platinum) and a selectivity for 1-butene which was higher than that of catalyst E which had isotropic metallic particles with a form factor F of 1.

Example 11

Catalytic Synthesis Gas Conversion Test

The synthesis gas conversion reaction was carried out in a continuous fixed bed reactor at a constant pressure of 2 MPa of hydrogen and a temperature of 220° C. The hourly space velocity was kept at about $1500\,h^{-1}$ and the $H_2/CO$ molar ratio was kept to 2.

The catalytic activities, expressed in terms of carbon monoxide conversion, are shown in Table 2 below. Prior to the catalytic test, catalyst C was treated in hydrogen at 100° C.; catalyst F was treated in hydrogen at 400° C.

TABLE 2

Activities and selectivities, measured for conversion of synthesis gas into hydrocarbons

|  | CO conversion % | Yield of >$C_5$ hydrocarbons % | % $CH_4$ |
| --- | --- | --- | --- |
| Catalyst C | 31 | 69 | 9 |
| Catalyst F | 32 | 54 | 14 |

For the same carbon monoxide conversion, catalyst C, the metallic particles of which had a mean form factor F of 0.55, had a higher selectivity for heavy hydrocarbons than that observed for catalyst F, the metallic particles of which were isotropic with a mean form factor F of 1.

Example 12

Catalytic Test for Transformation of a Petroleum Cut (Catalytic Reforming)

The catalytic reforming reaction was carried out in the presence of hydrogen ($H_2$/feed molar ratio=5) in a continuous fixed bed reactor on a petroleum cut which had the following characteristics:
  density at 20° C.: 0.75 kg/dm3;
  research octane number: 60;
  paraffins content: 51%;
  naphthenes content: 36%;
  aromatics content: 13%.
The experimental conditions were as follows:
  a total pressure of 0.3 MPa;
  a temperature of 500° C.; and
  a feed flow rate of 3 kg/kg of catalyst.

During the test, the temperature was gradually adjusted to keep the octane number constant. Prior to the catalytic test, catalyst B was treated in hydrogen at 100° C.; catalyst E was treated in hydrogen at 550° C. The catalytic performances obtained after 10 hours of operation are shown in Table 3 below.

TABLE 3

Activities and selectivities, measured for catalytic reforming

|  | Research octane number | Reformate yield (wt %) | Aromatics yield (wt %) |
| --- | --- | --- | --- |
| Catalyst B | 102 | 92 | 74 |
| Catalyst E | 102 | 92 | 72 |

Catalyst B, which contained metallic particles with a mean form factor F of 0.50, had an improved aromatics yield compared with catalyst E which contained isotropic metallic particles.

Example 13

Catalytic C10 to C14 Paraffin Dehydrogenation Test

The C10 to C14 paraffin dehydrogenation test was carried out in a traversed bed reactor at 450° C. at a pressure of 0.29 MPa with a molar ratio of hydrogen to hydrocarbons of 6, and a HSV of 20 $h^{-1}$. A makeup of 2000 ppm of water was supplied throughout the test.

Prior to the test, catalysts B and E underwent the following preparation steps:

100 g of catalyst was dissolved in 450 ml of distilled water. 0.64 g of tin dichloride was added to the solution in the presence of hydrochloric acid. The suspension was stirred for 4 hours;

the catalyst was dried, then dissolved again in 100 ml of distilled water the pH of which had been adjusted to 1.3 by adding nitric acid containing 3.45 g of lithium nitrate. The suspension was stirred for 3 hours;

the catalysts were dried at 100° C. for 2 hours in air;

catalyst B was then treated in hydrogen at 100° C.; catalyst E was treated in hydrogen at 550° C.

The catalytic performances measured after 100 hours of operation are shown in Table 4 below.

TABLE 4

Activities and selectivities, measured for paraffin dehydrogenation

|  | Catalyst B | Catalyst E |
| --- | --- | --- |
| Conversion of C10-C14 n-paraffins (%) | 8.37 | 8.0 |
| Conversion of C10-C14 olefins (%) | 7.7 | 7.10 |
| Yield of C10-C14 aromatics (%) | 0.12 | 0.28 |
| Yield of C10-C14 diolefins (%) | 0.26 | 0.25 |
| Yield of C10-C14 iso-paraffins (%) | 0.20 | 0.22 |
| Yield of other C10– and C14+ products (%) | 0.09 | 0.15 |

At C10 to C14 paraffin iso-conversion, catalyst B, which contained metallic particles with a mean form factor F of 0.50, produced a higher olefins yield and a lower aromatics yield than those obtained with catalyst E which contained isotropic metallic particles.

Example 14

Catalytic Selective Carbon Monoxide Oxidation Test

The selective carbon monoxide oxidation reaction was carried out in a traversed bed reactor at atmospheric pressure at temperatures in the range 70° C. to 130° C. The CO:H2:O2:He reaction mixture comprised 2% by weight of carbon monoxide and 50% by weight of $H_2$, with a CO/O2 ratio of 3. The catalytic performances are given in Table 5 below.

TABLE 5

Activities measured for selective carbon monoxide oxidation at 100° C.

|  | Catalyst B | Catalyst E |
| --- | --- | --- |
| CO conversion (%) | 100 | 100 |
| O2 selectivity (%) | 48 | 40 |

The selectivity measured for the conversion of oxygen for catalyst B, which contained metallic particles with a mean form factor F of 0.50, was higher than that measured for catalyst E which contained isotropic metallic particles.

Example 15

Hydrogen Storage Capacity Test

The hydrogen storage capacity test was carried out on a Rubotherm pressure thermobalance which allowed the hydrogen absorption kinetics to be followed over a temperature range between 20° C. and 1000° C. and a pressure in the range 1 to 50 rods. The test catalyst was placed in the measuring crucible, then the reactor was purged by placing it under vacuum and flushing with hydrogen then placing under hydrogen pressure. Thermal cycles were then carried out to determine the hydrogen adsorption kinetics (hydriding) and hydrogen desorption kinetics (decomposition).

TABLE 6

Hydrogen storage capacities for T = 150° C., H2 pressure = 0.1 MPa

|  | Catalyst A | Catalyst D |
| --- | --- | --- |
| H2 storage capacity (wt %) | 0.62 | 0.40 |

The hydrogen adsorption capacity measured for catalyst A which contained metallic particles with a form factor of 0.54 was higher than the hydrogen adsorption capacity measured for catalyst D which contained metallic particles with a form factor of 1.

The invention claimed is:

1. A process for preparing anisotropic metallic nanoparticles comprising using two different reducing agents R1 and R2 on a source of at least one metal selected from columns 8, 9 or 10 of the periodic table of the elements, reducing agent R1 having higher reducing power than reducing agent R2, said process comprising:
   a) one of the following:
      a1) impregnating a support with an aqueous solution comprising a source of at least one metal selected from columns 8, 9 or 10 of the periodic table of the elements, then bringing said support into contact with a reducing agent R1; or
      a2) bringing an aqueous solution comprising a source of at least one metal selected from columns 8, 9 or 10 into contact with a reducing agent R1;
   b) forming anisotropic metallic nanoparticles by bringing the solution or support obtained in a) into contact with reducing agent R2, which is different from R1; and
   c) if a) is a2), then optionally depositing the anisotropic metallic nanoparticles onto a support,
wherein b) is carried out after a), in a "two-step" process by introducing the reducing agent R2 after forming seeds of metallic nanoparticles.

2. A process according to claim 1, wherein the metal is nickel, cobalt, iron, ruthenium, platinum, palladium or iridium.

3. A process according to claim 2, wherein the metal is cobalt, nickel, palladium or platinum.

4. A process according to claim 1, wherein the reducing agent R1 is:
hydrogen, hydrazine, hydroxylamines, alkali hydrides or borohydrides and the reducing agent R2 is:
carboxylic acids, alcohols, polyols, aldehydes, ketones or ions thereof.

5. A process according to claim 1, wherein a base is added during b).

6. A process according to claim 1, wherein an inorganic salt is added during b).

7. A process according to claim 6, wherein the inorganic salt is an alkali or alkaline-earth halide.

8. A process according to claim 1, wherein a stabilizing agent is added to at least one of the solutions in contact with R1 or R2.

9. A process according to claim 8, wherein the stabilizing agent is a surfactant or a complexing agent.

10. A process according to claim 8, wherein:
the stabilizing agent and the source of the metal are dissolved separately;
followed by mixing at least a portion of the dissolved stabilizing agent and at least a portion of the dissolved metal source.

11. A process according to claim 1, wherein the anisotropic metallic nanoparticles obtained includes a support, said support being an oxide with a texture which is not ordered.

12. A process according to claim 11, wherein the support is alumina or silica.

13. A process according to claim 1 wherein, after b) or c), at least one element following is introduced into the support by impregnation:
elements from column 13 of the periodic table of the elements;
elements from column 14 of the periodic table of the elements;
alkali metals
alkaline-earth metals;
halogens; or
elements from column 11 of the periodic table of the elements.

14. A process according to claim 1, wherein the mean size of the anisotropic metallic nanoparticles is in the range 10 to 500 nm.

15. A process according to claim 1, wherein during b), anisotropic metallic nanoparticles with a form factor F of less than 0.7 are formed.

16. A process according to claim 1, wherein at least 50% of the metallic nanoparticles is in the form of anisotropic metallic nanoparticles.

17. A process according to claim 1, wherein the support containing the anisotropic metallic nanoparticles obtained at the end of steps a1)+b) or c) is separated from the liquid, dried at a temperature of 120° C. or less.

18. A process according to claim 17, wherein the support undergoes an activation treatment in hydrogen at a temperature of less than 600° C.

19. A process according to claim 1, wherein the anisotropic metallic nanoparticles obtained at the end of b) are separated from the liquid and optionally dried.

20. A process according to claim 19, wherein the solid anisotropic metallic nanoparticles obtained undergo an activation treatment in hydrogen at a temperature of less than 600° C.

21. A process according to claim 20, wherein the anisotropic metallic nanoparticles obtained are taken up into suspension.

22. A process according to claim 21, wherein the suspension undergoes an activation treatment in hydrogen at a temperature of less than 600° C.

23. A process according to claim 1, wherein the suspension obtained at the end of step a2)+b) of the process undergoes an activation treatment in hydrogen at a temperature of less than 600° C.

* * * * *